(12) United States Patent
Borkent et al.

(10) Patent No.: US 8,747,506 B2
(45) Date of Patent: Jun. 10, 2014

(54) ATMOSPHERIC AIR FILTRATION UNIT, AIR PRE-FILTRATION UNIT, AND ASSOCIATED AIR FILTRATION SYSTEM FOR REMOVABLE ATTACHMENT THEREOF

(71) Applicant: Fais Inc., Wilmington, DE (US)

(72) Inventors: Pieter K. Borkent, Amsterdam (NL); Cory A. Roehm, Orlando, FL (US)

(73) Assignee: Fais Inc., Wilmington, DE (US)

( * ) Notice: Subject to any disclaimer, the term of this patent is extended or adjusted under 35 U.S.C. 154(b) by 0 days.

(21) Appl. No.: 13/960,222

(22) Filed: Aug. 6, 2013

(65) Prior Publication Data

US 2013/0312378 A1    Nov. 28, 2013

Related U.S. Application Data

(62) Division of application No. 12/839,199, filed on Jul. 19, 2010, now Pat. No. 8,523,972.

(51) Int. Cl.
*B01D 46/00* (2006.01)

(52) U.S. Cl.
USPC ............ 55/495; 55/497; 55/501; 55/511; 55/DIG. 31

(58) Field of Classification Search
USPC ............ 55/495, 497, 511, 501, DIG. 31
See application file for complete search history.

(56) References Cited

U.S. PATENT DOCUMENTS

| | | | |
|---|---|---|---|
| 4,233,044 A | | 11/1980 | Allan |
| 5,603,476 A | * | 2/1997 | Merk et al. ............ 248/309.1 |
| 6,797,028 B2 | * | 9/2004 | Duffy .................... 55/385.2 |
| 6,955,696 B1 | | 10/2005 | Ost et al. |
| 6,960,245 B2 | | 11/2005 | Tokar et al. |
| 7,128,771 B2 | | 10/2006 | Harden |
| 8,105,409 B2 | | 1/2012 | Mann et al. |
| 8,303,678 B2 | | 11/2012 | Steel et al. |
| 2003/0177745 A1 | * | 9/2003 | Jauw ..................... 55/497 |
| 2007/0199449 A1 | | 8/2007 | Wiser et al. |
| 2009/0183474 A1 | * | 7/2009 | Workman ............... 55/385.2 |
| 2009/0183477 A1 | * | 7/2009 | Workman ............... 55/495 |

OTHER PUBLICATIONS

Brochure: Viledon MV 15 Nano Extended Surface V-Style Filter Hybrid-Synthetic Nanofiber Technology. Freudenberg Filtration Technologies.
Brochure: Filtrair® FMV-series V-style compact box filters.
Brochure: FMV Filter. Jan. 2006.

(Continued)

*Primary Examiner* — Robert Clemente
(74) *Attorney, Agent, or Firm* — Oblon, Spivak, McClelland, Maier & Neustadt, L.L.P.

(57) ABSTRACT

An air filtration system including a pre-filtration unit having a filter section and a spacer section attached to the filter section and extending downstream from the filter section, a pre-filter attachment device having a pre-filter securing section and a first plurality of coupling members, and a filtration unit. The filter section includes a pre-filter. The spacer section includes an at least partially open end located on a downstream side of the spacer section to expose a downstream face of the pre-filter. The filtration unit includes a filter frame, an upper section thereof including an upstream-facing surface having a plurality of openings, a filter secured inside the lower section of filter frame, and a second plurality of coupling members located on the filter frame and coupleable with the first plurality of coupling members of the pre-filter attachment device to removeably secure the pre-filtration unit to the filtration unit.

9 Claims, 8 Drawing Sheets

(56) References Cited

OTHER PUBLICATIONS

Brochure: Series 1511 DURAFIL™ Extended-Life High-Efficiency Filter. 2002.
Brochure: Cam GT for turbo machinery. Camfil FARR.
Brochure: Filtration Group-Titan FP Filter. Nov. 2004.
Brochure: camfil Farr. Disposable air filters.
Brochure: camfil Farr. 40% more media goes a long way. 30/30 Panel Filter.
Brochure: camfil Farr. Offshore filter systems. 2004.
Brochure: filtration products. 2004.
Brochure: camfil For a cleaner environment. Air Filter Products and Accessories. 1998.
"Swedish group buys St-Gobain filters arm." Financial Times, Nov. 27, 1989.
"Filters and Filtration." by Timothy J. Robinson and Alan E. Ouellet. ASHRAE Journal, Apr. 1999, pp. 58-63.
Brochure: camfil. Compact filters—Filters for saving space. 1992.

* cited by examiner

ATMOSPHERIC AIR FILTRATION UNIT, AIR PRE-FILTRATION UNIT, AND ASSOCIATED AIR FILTRATION SYSTEM FOR REMOVABLE ATTACHMENT THEREOF

CROSS-REFERENCE TO RELATED APPLICATIONS

The present application is a divisional application of and claims the benefit of priority under 35 U.S.C. §120 from U.S. application Ser. No. 12/839,199, filed Jul. 19, 2010, the entire contents of which is incorporated herein by reference.

BACKGROUND OF THE INVENTION

1. Field of the Invention

The field of the present invention is atmospheric air filtration units, and in particular, an air filtration unit having an air pre-filtration unit and pre-filter attachment device associated therewith for abutting the air pre-filtration unit to the air filtration unit.

2. Background

In heating, ventilating, and air conditioning systems (HVAC systems), and more specifically in variable air volume (VAV) HVAC systems, mini-pleat box filters can be used as medium and high efficiency air filters. Mini-pleat box filters may be configured to filter an air flow in varying filtration efficiencies, such as 65%, 85%, 95%, and 98%. For compatibility with most HVAC systems, mini-pleat box filters are generally square or rectangularly-shaped when viewed from an upstream side.

The fiberglass paper or synthetic non-woven filtration media used in mini-pleat box filters are conventionally rectangularly-shaped mini-pleat media packs which are placed in the mini-pleat box filters in pairs to form a V-shaped filter cells. These media packs are sometimes rigid enough that they may be used without the use of separators. Traditionally, separators held the filtering pleats in position and were often made of corrugated aluminum sheets. The non-woven synthetic fiber media packs can be favored in some applications over the separator-type filtering pleats as they can reduce the decrease in pressure ("the pressure drop") between an upstream side of the mini-pleat box filter and a downstream side. They also can provide more air flow through the filtration media and can expose the full media surface to the airflow.

In multiple stage filtration systems, a panel or pad filter (pre-filter) can be placed upstream of a mini-pleat box filter (main filter) as part of a pre-filtration stage to remove larger particle sizes from an airflow flowing through the HVAC system. This can be useful to prolong the filtration life of the main filter. The pre-filter stage is generally located upstream from the main filter at a sufficient distance so as to prevent the pre-filter from blinding the main filter. If the pre-filter is arranged so closely to the main filter, that it almost touches the ribs of the main filter, it can disturb the flow of air reaching the pre-filter and the main filter, and thus prevent at least a portion of the airflow from crossing through the main filter. This prevention of airflow by the pre-filter, defined herein as "blinding," can result in higher energy cost and a higher pressure drop over the total filter assembly and reduce the filtration capacity of the main filter.

Some multiple stage filtration systems provide an entirely separate section in the filtration system to accommodate the pre-filter. As a result, a pre-filter holding frame must be added to these filtration systems, and the filtration systems must be made larger as they require more space in order to accommodate the separate pre-filter section. These filtration systems may also require maintenance personnel to change the main filter and the pre-filter in different locations of the filtration system.

Other multiple stage filtration systems that combine the pre-filter and main-filter stages, do so at the expense of filtration efficiency. For example, in one alternative an upstream edge of the V-shaped filter cells is recessed from an upstream face of the mini-pleat box filter to separate the V-shaped filter cells from the filtration media of a pre-filter that is abutted to the upstream face. A disadvantage of this approach can be in some instances that the recessing is done by reducing the size of the V-shaped media packs, which reduces the filtering potential of the mini-pleat box filter.

In another example, the filtration media of the pre-filter can be recessed in areas located opposite of an upstream edge of the V-shaped media packs. However, doing so can lower the filtering potential of the pre-filter since filtration media must be removed to accommodate the recessed areas. Additionally, in the above examples, conventional metal retainers are generally used to hold the pre-filter in place. Use of these retainers can be disadvantageous in certain instances as the metal retainers can fit loosely and easily corrode, producing corrosion dust particles.

SUMMARY OF THE INVENTION

The present invention provides an air pre-filtration unit, a an air filtration unit, and an air filtration system for the abutted removeable attachment of the air pre-filtration unit to the air filtration unit while maximizing the filtering potential of the air filtration unit and air pre-filtration unit, and preventing blinding of the air filtration unit by the air pre-filtration unit. Additionally, the air filtration system eliminates the need for two separate stages of filtration in an HVAC filtration system, thereby generally allowing for a reduction in energy consumption and for a more compact and less expensive HVAC system.

In a first separate aspect of the present invention, an air filtration unit includes a filter frame with an upper section located on an upstream side of the air filtration unit and a lower section connected to the upper section. The lower section is located downstream from the upper section. The upper section includes an upstream-facing surface having a plurality of openings and an air filter secured inside the lower section of filter frame such that the plurality of openings of the upper section provide fluid flow access to the air filter. The air filtration unit further includes a plurality of coupling members located on the filter frame, the plurality of coupling members configured to removeably secure a pre-filter attachment device to the upstream side of the air filtration unit via corresponding coupling members disposed on the pre-filter attachment device.

Further, in the first separate aspect of the present invention, the plurality of coupling members may be slotted protrusions that protrude outwardly from a surface of the filter frame. The plurality of coupling members may be made integral with the filter frame. The air filter may include a plurality of V-shaped filter cells from a cross-sectional view, where each of the V-shaped filter cells includes an open end on an upstream side to communicate with a corresponding opening of the plurality of openings of the upper section of the filter frame. The lower section may include a first side section and a second side section to enclose the air filter within the filter frame, the first side section and the second side section each including V-shaped grooves on sides facing the air filter to hold corresponding V-shaped ends of each of the plurality of V-shaped filter cells.

Optionally, in the first separate aspect of the present invention, the plurality of openings of the upstream-facing surface may be defined by parallelly arranged rib sections that connect opposite sides of the upper section, where the rib sections have a pointed cross-sectional profile in an upstream direction such that the pointed cross-sectional profile divides and directs fluid flowing downstream through the filtration system into each open end of V-shaped filter cells via the corresponding opening of the plurality of openings of the upstream-facing surface.

In a second separate aspect of the present invention, an air pre-filtration unit includes a filter section having a pre-filter, and a spacer section attached to a periphery of the filter section. The spacer section extends downstream from the filter section and has an at least partially open end located on a downstream side of the spacer section to expose a downstream face of the pre-filter. Optionally, the air pre-filtration unit may have a height in an upstream direction of about 4 inches, the filter section may have a height in an upstream direction of about 2 inches, and the spacer section may be defined by a downstream portion of a frame of the pre-filter unit.

In a third separate aspect of the present invention, a filtration system includes the air pre-filtration unit, a pre-filter attachment device having a pre-filter securing section and a first plurality of coupling members, and the air filtration unit as provided in the first separate aspect of the present invention. The air pre-filtration unit may be a standard air pre-filtration unit or one as provided in the second separate aspect of the present invention. The plurality of coupling members of the filter frame are coupleable with the first plurality of coupling members of the pre-filter attachment device to removeably secure the pre-filter attachment device to the upstream side of the air filtration unit. The pre-filter attachment device may removeably secure the air pre-filtration unit to the air filtration unit in an abutted position on the upstream side of the air filtration unit such that the downstream face the air pre-filter retained in the air pre-filtration unit is located at least 2 inches from the upstream-facing surface of the air filtration unit.

In a fourth separate aspect of the present invention, any of the foregoing aspects may be employed in combination.

Accordingly, an improved air pre-filtration unit, air filtration unit, and air filtration system are disclosed. Advantages of the improvements will appear from the drawings and the description of the following embodiments.

BRIEF DESCRIPTION OF THE DRAWINGS

In the drawings, wherein like reference numerals refer to similar components.

DETAILED DESCRIPTION OF THE INVENTION

Figure 1:
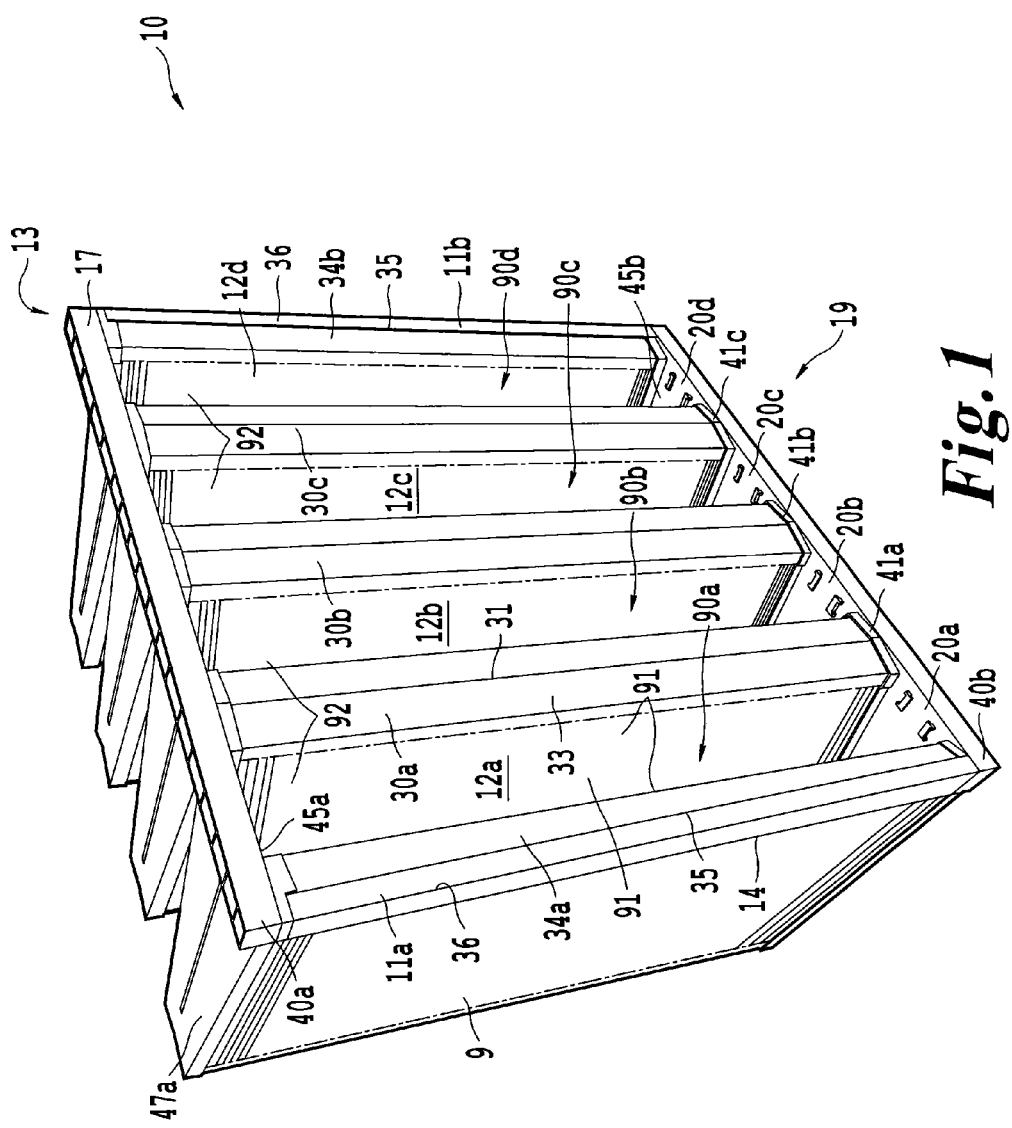
FIG. 1 illustrates an upstream-side perspective view of a filtration unit according to a first embodiment.

A pre-filtration unit, filtration unit, and filtration system are illustrated in FIGS. 1-8. Wherever possible, the same reference characters are used in the figures and the description to refer to the same or like parts.

Figure 2:
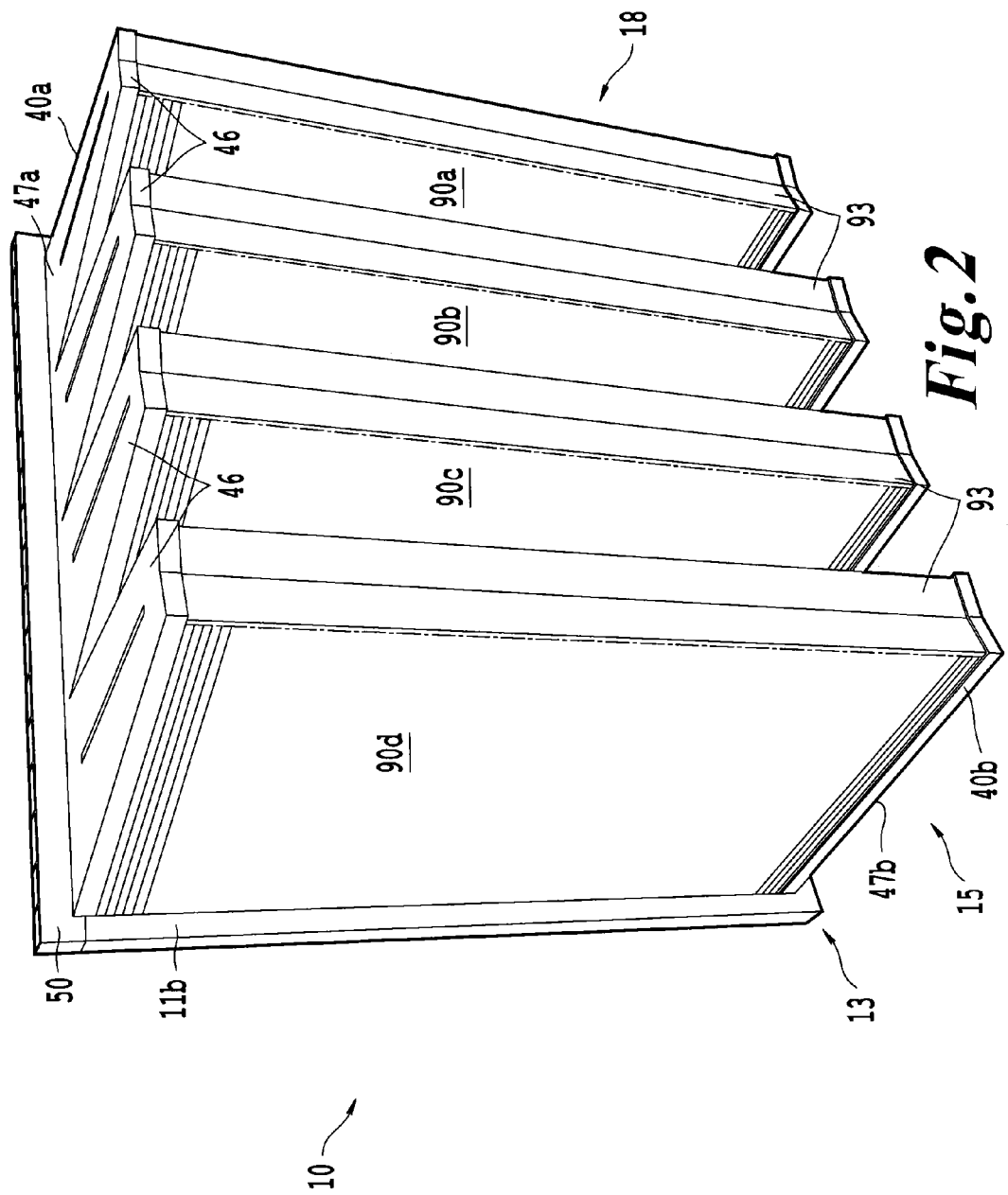
FIG. 2 illustrates a downstream-side perspective view of the filtration unit according to the first embodiment.

FIGS. 1 and 2 illustrate a filtration unit 10 according to a first embodiment. The filtration unit 10 can be constructed out of molded plastic materials, but may also be constructed out of metal or other suitable materials. The filtration unit 10 is a mini-pleat V-bank box-type air filter having an upstream side 19 that faces an airflow crossing through the filtration unit 10 and a downstream side 18. The filtration unit 10 includes a boxlike plastic filter frame 14 and a filter made up of a plurality of V-shaped mini-pleat pack filter cells 9(90a-d). The filter frame 14 has an outer structure defined by opposing side panels 40a and 40b, side frame rails 11a and 11b, and rib sections 30a-c. Preferably, an outer rectangular periphery of the filter frame 14, when viewed from an upstream side, is 24 inches by 24 inches, or alternatively 24 inches by 12 inches, and a depth of the filter frame is 12 inches, although these dimensions might vary slightly and other sizes may conceivably be used.

In this embodiment, the side panels 40a and 40b are identical mirror images of each other, W-shaped, and respectively include inner sides 45a and 45b and outer sides 47a and 47b, as further shown in FIGS. 1, 2, 4 and 5. A plurality of V-shaped channels 54 are provided on the inner sides 45a and 45b to enclose and secure V-shaped ends (not depicted) of the V-shaped filter cells 90a-d. The V-shaped channels 54 provided on the inner sides 45a and 45b are connected at an upstream end of the inner sides 45a and 45b to define a continuous zigzagging channel 55 that zigzags along W-shaped ends 46 of the side panels from one upstream corner of the inner sides 45a and 45b to an opposite upstream corner of the inner sides of the side panels 45a and 45b. "Upstream" is defined as describing a position located closer to a source of an airflow, and "downstream" is defined as describing a position located further away from the source of the airflow than the "upstream" position. Similarly, when describing a location, "upper" is defined as describing a position located upstream of a "lower" position.

The side frame rails 11a and 11b connect the side panels 40a and 40b via locking members 52. The locking members 52 are block-shaped protrusions provided at upstream corners of the inner sides 45a and 45b. These block-shaped protrusions 52 interlock with corresponding rectangularly-shaped hollow ends (not depicted) of the side frame rails 11a and 11b to form a boxlike frame shape.

Figure 4:
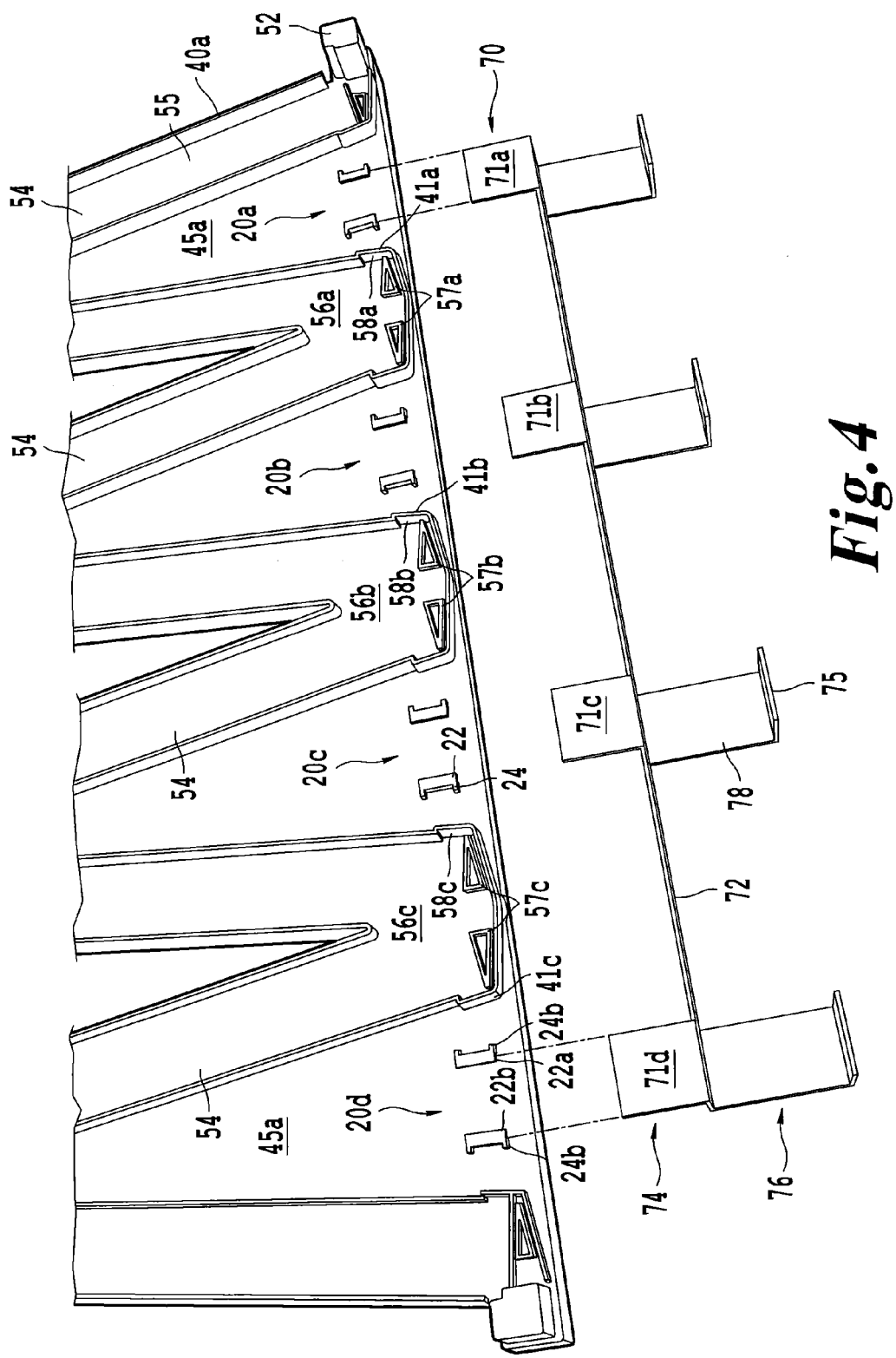
FIG. 4 illustrates a partial perspective view of an inside surface of a side portion of the filtration unit according to the first embodiment and a perspective view of a complementary pre-filter attachment device according to a second embodiment.

The rib sections 30a-c are equidistantly spaced from one another and the from side frame rails 11a and 11b and parallelly span from the side panel 40a to the side panel 40b. The rib sections 30a-c respectively connect the side panels 40a and 40b via rib brackets 41a-c provided at the upstream peaks 56a-c of the zigzagging channel 55, as shown in FIGS. 1 and 4. The rib brackets 41a-c are respectively defined by hat-shaped outer locking members 58a-c and triangular inner locking members 57a-c. The hat-shaped outer locking members 58a-c are respectively incorporated into the upstream peaks 56a-c of the zigzagging channel 55. The triangularly-shaped locking members 57a-c are disposed on the inner sides 45a and 45b, and protrude outwardly therefrom, in an inner portion of the hat-shaped outer locking members 58a-c, respectively. Hollow ends (not depicted) of the rib sections 30a-c are respectively inserted into the rib brackets 41a-c such that the hat-shaped outer locking members 58a-c and the triangular inner locking members 57a-c respectively grip outer and inner end surfaces of the rib sections 30a-c.

Together, the side frame rails 11a and 11b and a flanged upstream end of the side panels 40a and 40b define a flanged, rectangular upper section 13 when viewed from an upstream side of the filtration unit. The flanged rectangular upper section 13 includes an upstream-facing surface 17 and a downstream-facing surface 50. A downstream portion of side panels 40a and 40b define a lower section 15 that secures and encloses the V-shaped filter cells 90a-d.

The parallel rib sections 30a-c spanning from the side panel 40a to the side panel 40b define a plurality of openings 12a-d that correspond with the open ends 92 of the V-shaped filter cells 90a-d that are secured inside the lower section 15. The rib sections 30a-c also cover abutted upstream edges (not depicted) of the V-shaped filter cells 90a-d that are provided in the filter frame 14. Outermost upstream edges (not depicted) of the outermost V-shaped filter cells 90a and 90d that do not abut an adjacent V-shaped filter cell are covered by half rib sections 34a and 34b included with the side frame rails 11a and 11b which span across the filtration unit from the side panel 40a to the side panel 40b. The upstream facing surfaces 33 of the rib sections 30a-c are aerodynamically shaped to divide and direct the airflow into the corresponding openings 12a-d.

In this embodiment, the rib sections 30a-c covering the upstream edges of the V-shaped filter cells 90a-d can be substantially flush with the upstream-facing surface 17 of the filtration unit 10, such that the largest possible V-shaped filter cells can be provided inside the filter frame 14. This can, in turn, allow more filtration media to be accommodated in the V-shaped filter cells 90a-d and can result in a filtration unit that is more efficient and that provides a lower pressure drop across the filtration unit.

In one embodiment, upstream facing surfaces 33 of rib sections 30a-c may come to a point along a center 31 and slope downstreamwardly therefrom to parallel edges of the abutting openings 12a-d. Similarly, the half rib sections 34a and 34b slope downstreamwardly from a transition line 35 that denotes a transition between rectangularly-shaped outer portions 36 and the half rib sections 34a and 34b to outermost edges of the outermost openings 12a and 12d. The aerodynamic shape of the rib sections 30a-c and the half rib sections 34a and 34b splits and directs the airflow entering the filter unit 10 into the open ends 92 of V-shaped filter cells 90a-d, thereby decreasing and mitigating air pressure resistance, helping to prevent blinding by an attached pre-filtration unit, and decreasing energy consumption from fans pushing the airflow.

As shown in FIGS. 1 and 2, the V-shaped filter cells 90a-d are V-style or V-bank filter cells formed of pairs rectangular non-woven synthetic fiber media packs or fiberglass paper packs 91 that are adjoined along downstream ends in a V-shape orientation by fibrous backing material adhered to the downstream ends, where the adjoining downstream ends define closed ends 93 of the V-shaped filter cells 90a-d. The upstream ends of the pairs of rectangular synthetic media or fiberglass packs 91 are separated to define open ends 92 of the V-shaped filter cells 90a-d. While FIGS. 1 and 2 depict using four V-shaped filter cells 90a-d, any number of V-shaped filter cells may conceivably be used.

Figure 3:
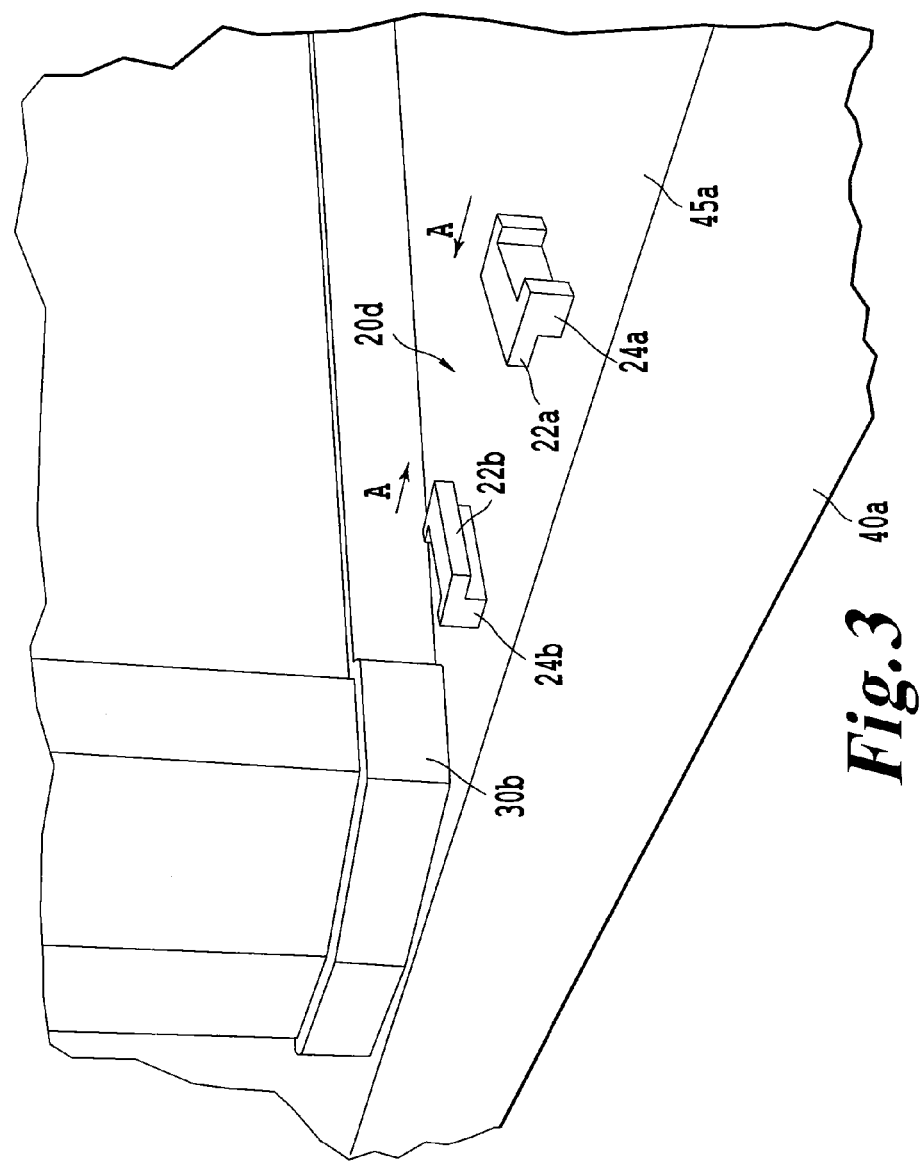
FIG. 3 illustrates a perspective view of a coupling device of the filtration unit according to the first embodiment.

As shown in FIGS. 1-4, the filtration unit 10 further includes identical coupling members 20a-d incorporated into the side panels 40a and 40b of the filter frame 14. FIG. 3 shows only coupling member 20a but the aspects of the coupling member 20a in this figure are applicable to all the coupling members 20a-d located on both side panels 40a and 40b. Coupling members 20a-d may be integrally formed on the inner sides 45a and 45b at upstream ends, and respectively centered in between the evenly spaced side frame rail 11a, rib sections 30a-c, and side frame rail 11b. The coupling members 20a-d are not limited to being integral with the filter frame 14, but may be separately formed and attached to the filter frame 14 with fasteners. Also, the coupling members 20a-d may conceivably be placed in other locations on the frame.

The coupling members 20a-d are preferably slots defined by opposing sides 24a and 24b that protrude outwardly from inner sides 45a and 45b, where opposing sides 24a and 24b of the slots respectively include identical flanges 22a and 22b at protruding ends. Flanges 22a and 22b are oriented inwardly such that they face one another, as shown by arrows A in FIG. 3.

Figure 5:
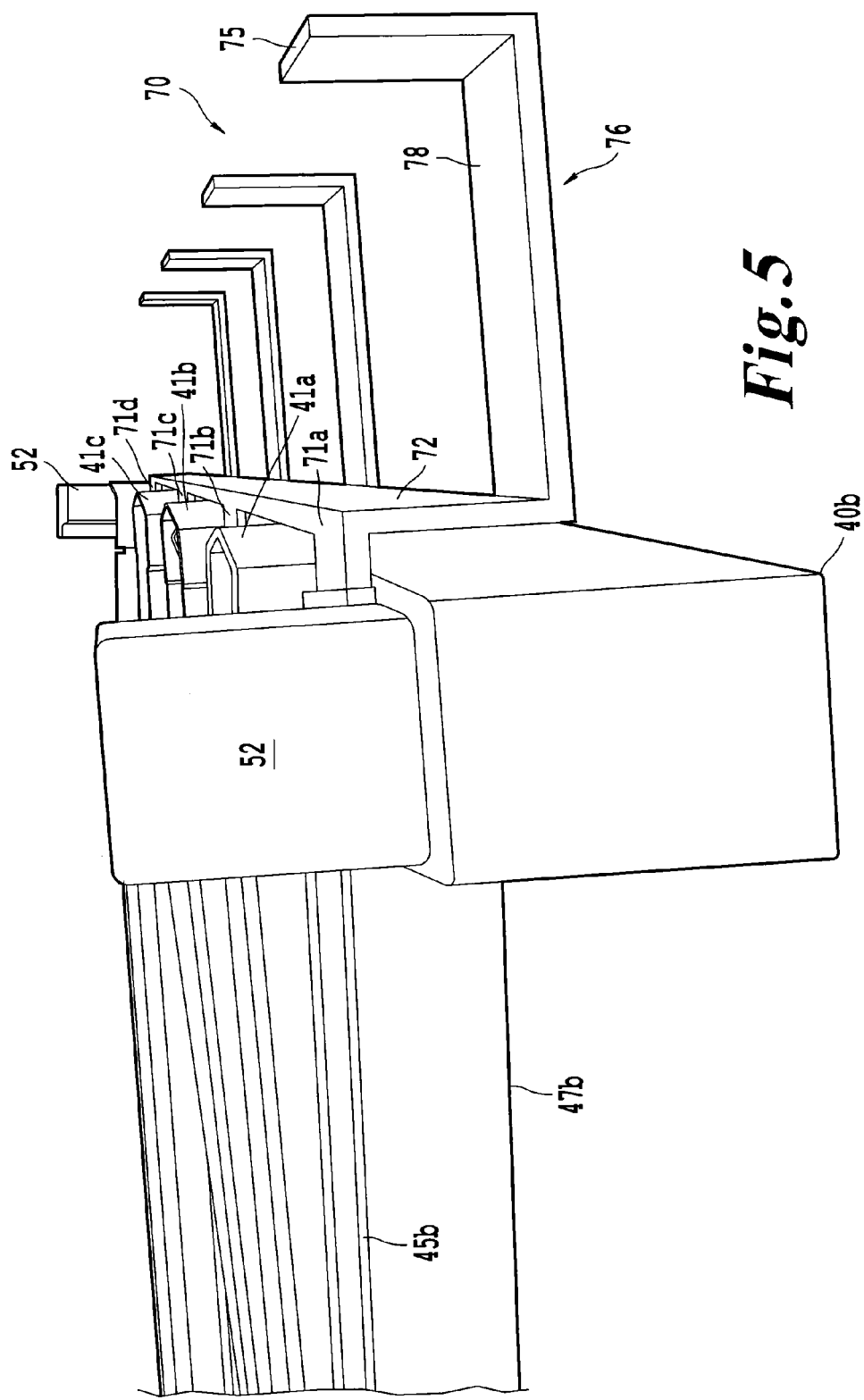
FIG. 5 illustrates another partial perspective view of a side portion of the filtration unit according to the first embodiment and a perspective view of a complementary pre-filter attachment device according to the second embodiment.

According to a second embodiment of the present invention, as illustrated in FIGS. 4 and 5, a pre-filter attachment device 70 includes a pre-filter securing section 76 and coupling section 74 comprising a plurality of coupling members. The coupling members depicted in FIGS. 4 and 5 are flat elongated protrusions 71a-d that protrude outwardly in a downstream direction from the pre-filter securing section 76 and insert into the slots defined by opposing sides 24a and 24b and the flanges 22a and 22b of coupling members 20a-d. Coupling members having other suitable configurations may be also be used. The slots grip the flat elongated protrusions 71a-d to removeably secure a pre-filter attachment device 70 to each of the side panels 40a and 40b. While, in this embodiment, the pre-filter attachment device 70 is constructed from molded plastic materials, it may also conceivably be constructed from other suitable materials.

Further, as shown in FIGS. 4 and 5, the pre-filter securing section 76 includes a flat rectangularly elongated backbone 72 and a plurality of brackets 78 that are sized to slideably accept and grip an edge of a correspondingly sized pre-filtration unit. The flat elongated protrusions 71a-d are formed on an inner edge of the flat rectangular backbone 72 and protrude downstream from and perpendicular to a downstream surface of the flat rectangular backbone 72. The plurality of brackets 78 are L-shaped brackets formed on an outer edge of the flat rectangular backbone 72 and protrude upstream from and perpendicular to an upstream surface of the flat rectangular backbone 72. The flanges 75 of the plurality of brackets 78 protrude inwardly at an upstream end of the brackets 78. In this embodiment, a downstream surface of the flanges 75 is located about 2 inches or about 4 inches from an upstream surface of the flat elongated rectangular backbone 72 to respectively accommodate a 2 inch or 4 inch thick pre-filtration unit, however the brackets may be sized to accommodate the thickness of any pre-filtration unit, up to 12 inches or more.

Figure 6:
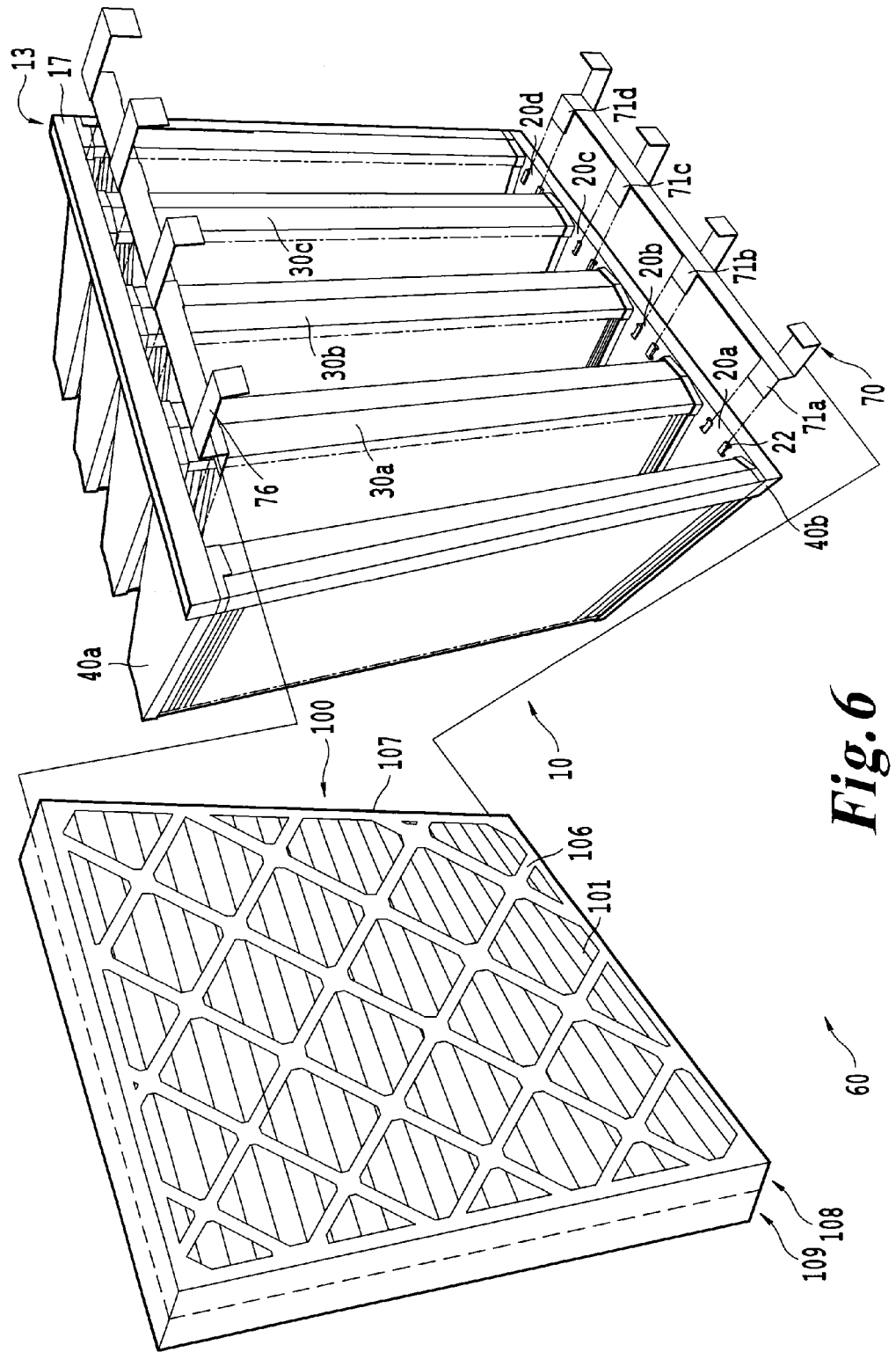
FIG. 6 illustrates an exploded perspective view of a filtration system according to a third embodiment.
Figure 7:
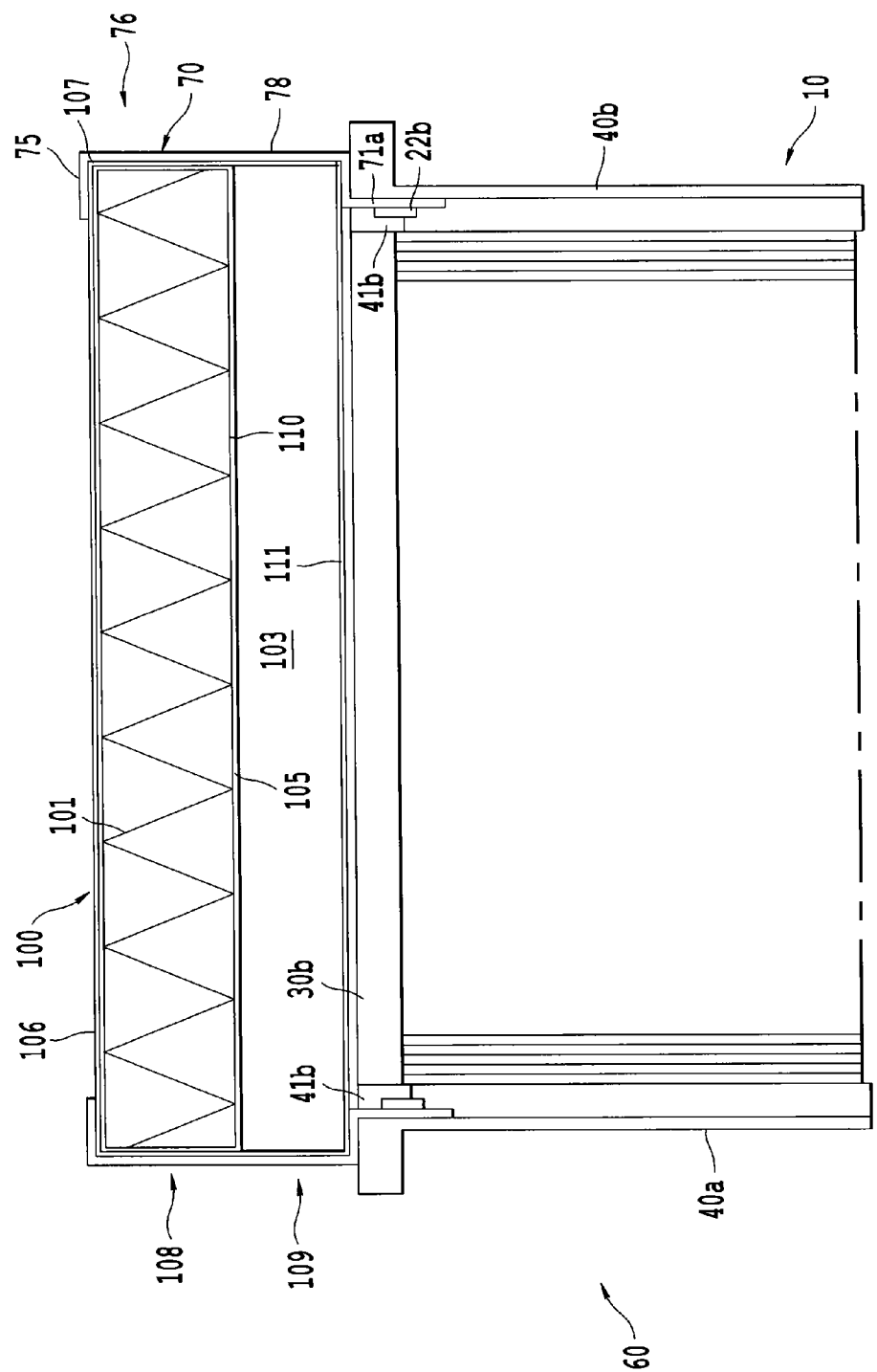
FIG. 7 illustrates a cross-sectional view of the filtration system according to the third embodiment.

In a third embodiment of the present invention, as shown in FIGS. 6 and 7, a filtration system 60 includes the filtration unit 10, two pre-filter attachment devices 70, one coupled to each of the side panels 40a and 40b of the filtration unit 70 via the slotted coupling members 20a-d and the flat elongated protrusions 71a-d, and a pre-filtration unit 100 slideably inserted into the brackets 78 of the pre-filter attachment devices 70.

When the pre-filter attachment devices 70 are removeably attached to the filtration unit 10, the flat rectangular backbones 72 of the pre-filter attachment devices 70 abut an edge of the upstream-facing surface 17 of the side panels 40a and 40b, respectively. The brackets 78 of the pre-filter attachment devices 70 are sized such that the pre-filtration unit 100 may be slideably inserted and securely held in place when used to filter an airflow, and subsequently slideably removed when being replaced during maintenance, for example.

Pre-filtration units secured by the pre-filter attachment devices 70 may be constructed of cardboard, plastic, galvanized metal, or other suitable materials. The brackets 78 of the pre-filter attachment devices 70 are preferably sized to accommodate standard 2 inch or 4 inch thick industry-size pre-filtration units or a pre-filtration unit 100, as described below in a fourth embodiment. However the brackets 78 are not limited to these sizes, and may be configured to accommodate pre-filtration units of any size or shape. If it is desired that a pre-filtration unit having a different thickness in an upstream direction be used, the existing pre-filter attachment devices may be removed by being pulled out from the slotted coupling members 20a-d of the filtration unit 10 and replaced with pre-filter attachment devices having brackets that are appropriately sized to slideably accommodate and secure the pre-filtration unit having the different thickness.

Figure 8:
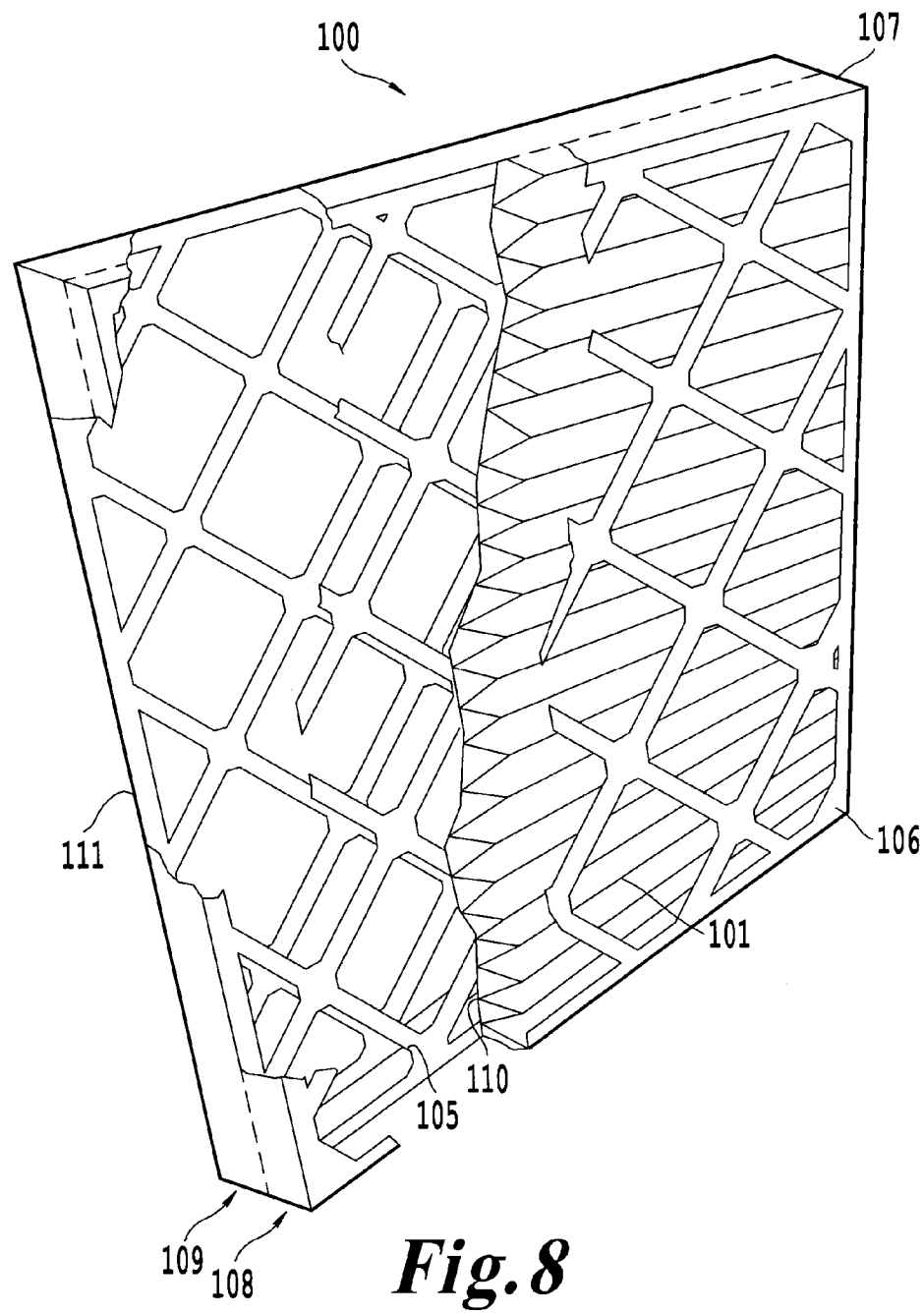
FIG. 8 illustrates a cut-away perspective view of a pre-filtration unit according to a fourth embodiment.

FIGS. 6-8 depict a pre-filtration unit 100 according to a fourth embodiment. The pre-filtration unit 100 is a rectangular panel-type filtration unit that includes a frame 107 divided into a filter section 108 having a pleated filtration media pack 101 and a spacer section 109 defining a void 103. The frame 107 of the pre-filtration unit 100 may be constructed from cardboard, plastic, galvanized metal, or other suitable materials. Preferably, an outer rectangular periphery of the frame 107 of the pre-filtration unit 100, when viewed from an upstream side, is 24 inches by 24 inches, or alternatively 24 inches by 12 inches, however, these dimensions might vary slightly, and other sizes may conceivably be used. Generally, the outer rectangular size of the frame 107 of the pre-filtration unit 100 that is slideably inserted into the pre-filter attachment device 70 is sized to match the outer rectangular size of the upstream-facing surface 17 of the filtration unit 10.

The frame 107 of the pre-filtration unit 100 has a thickness from an upstream side 106 to a downstream side 111 of about 4 inches. The frame 107 includes a latticed horizontal retainer 105, horizontal being defined as an orientation that is perpendicular the upstream direction, that divides the frame 107 into the two sections, namely the filter section 108, and the spacer section 109. An upstream side of the frame 107 is also latticed to allow airflow to pass through the filtration media pack 101. The filter section 108 is defined by the horizontal retainer 105 and the portion of the frame 107 connected to and located above the horizontal retainer 105. The horizontal retainer 105 retains and exposes a downstream face 110 of the filtration media pack 101 located inside the filter section 108. The filter section 108 is sized to accommodate the rectangular pleated filtration media pack 101 having a thickness of about 2 inches in an upstream direction. Depending on the application, however, other thicknesses of the frame 107 and the filtration media pack 101 may conceivably be used.

The spacer section 109 is located downstream of the filter section 108 and is defined by the downstream side 111 and the portion of the frame 107 located below the horizontal retainer 105. The downstream side 111 is latticed similar to the upstream side 106 and the horizontal retainer 105 to define at least a partially open downstream end that, in combination with the openings of the latticed horizontal retainer 105, exposes the downstream face 110 of the filtration media pack 101 in the downstream direction. The upstream side 106 and the downstream side 111 are not limited to being latticed but may be open or may have other types of openings formed therein. Similarly, the horizontal retainer 105 may be configured in other suitable ways that both retain and expose the downstream face 110 of the filtration media pack 101 as described above.

As shown in FIG. 6, when the pre-filtration unit 100 is slideably inserted into the pre-filter attachment devices 70 which are already or subsequently coupled to the side panels of 40a and 40b filtration unit 10 via the coupling members 20a-d and 71a-d, the spacer section 109 spaces the downstream face 110 of the filtration media pack 101 retained by the horizontal retainer 105 at least two inches away from the upstream-facing surface 17 of the filtration unit 10 in an upstream direction. As discussed above, spacing the downstream face of the filtration media 101 retained by the horizontal retainer 105 at least two inches away from the upstream-facing surface 17 of the filtration unit 10, helps to prevent blinding of the filtration unit 10 by the pre-filtration unit 100. Additionally, the efficiency of the pre-filtration unit 100 can be maximized as there are no recesses required to be formed in the filtration media pack. Further, when combined, the aerodynamic rib sections 30a-c and 34a and 34b, the pre-filter attachment device 70, and the spacer section 109 provide a filtration system that has a more balanced and lower pressure drop, thus saving considerable money running the HVAC system. Also, running the HVAC system with lower pressure drops provides savings of up to 40% in energy consumption.

Therefore, a pre-filtration unit, filtration unit, and filtration system are disclosed. While embodiments of this invention have been shown and described, it will be apparent to those skilled in the art that many more modifications are possible without departing from the inventive concepts herein. The invention, therefore, is not to be restricted except in the spirit of the following claims.

The invention claimed is:

1. An air pre-filtration unit comprising:
a frame including a filter portion and a spacer portion, the filter portion located on an upstream side of the air pre-filtration unit and including an air pre-filter, and the spacer portion attached to the filter portion via the frame and extending downstream, in a downstream direction, from the filter portion;
a first retainer that is connected to the frame and that separates the filter portion from the spacer portion; and
a second retainer that is connected to the frame, that delimits the spacer portion in the downstream direction, and that provides an at least partially open end located on a downstream side of the spacer portion to expose a downstream face of the air pre-filter, wherein
each of the first and second retainers includes a structure that includes a plurality of members that span respective first and second cross-sections of the air pre-filtration unit such that the cross-sections are partially open to allow airflow to pass therethrough.

2. The air pre-filtration unit according to claim 1, wherein the air pre-filtration unit has a thickness in an upstream direction of about 4 inches, and the filter portion has a thickness in an upstream direction of about 2 inches.

3. The air pre-filtration unit according to claim 1, wherein the spacer portion includes a void delimited by the frame and the first and second retainers.

4. The air pre-filtration unit according to claim 1, further comprising:
a third retainer that is connected to the frame and that delimits the filter portion in the downstream direction, wherein
the third retainer includes a structure that includes a plurality of members that span a third cross-section of the air pre-filtration unit such that the third cross-section is partially open to allow airflow to pass therethrough.

5. The air pre-filtration unit according to claim 4, wherein the frame includes peripheral edges that are planar and that connect the first, second and third retainers.

6. The air pre-filtration unit according to claim 5, wherein the peripheral edges define contiguous surfaces that form a border of the air pre-filtration unit.

7. The air pre-filtration unit according to claim 4, wherein each of the retainers is a latticed retainer.

8. The air pre-filtration unit according to claim 1, wherein the air pre-filter is a pleated filtration media pack and the spacer portion includes a void downstream of the pleated filtration media pack.

9. The air pre-filtration unit according to claim 8, wherein the air pre-filtration unit has a thickness in an upstream direction of about 4 inches, the filter portion has a thickness in an upstream direction of about 2 inches, and the spacer portion has a thickness in the upstream direction of about 2 inches.

\* \* \* \* \*